April 28, 1925.
C. H. GUSTAFSON
HAND GRASP FOR AUTOMOBILES
Filed Feb. 6, 1923
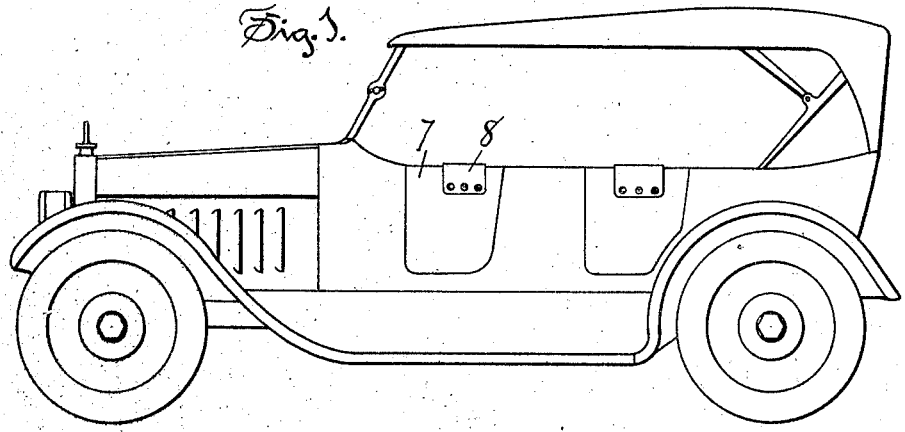
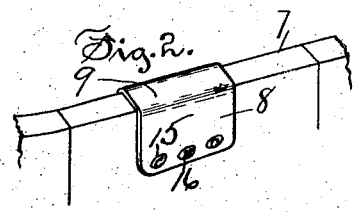
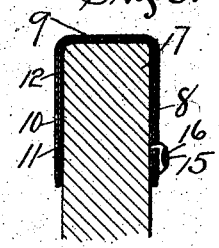 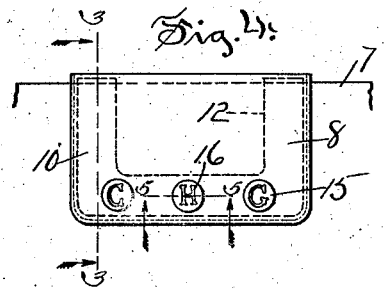
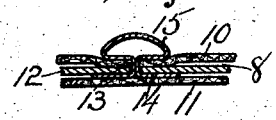 

Patented Apr. 28, 1925.

1,535,771

UNITED STATES PATENT OFFICE.

CARL H. GUSTAFSON, OF HARTFORD, CONNECTICUT.

HAND GRASP FOR AUTOMOBILES.

Application filed February 6, 1923. Serial No. 617,203.

*To all whom it may concern:*

Be it known that I, CARL H. GUSTAFSON, a citizen of the United States, and a resident of Hartford, in the county of Hartford and State of Connecticut, have invented new and Improved Hand Grasps for Automobiles, of which the following is a specification.

My invention relates to the class of devices placed to receive the grasp of the hands upon automobile doors and like structures and thus protect the surface or finish of such structures when they are grasped for the purpose of opening and closing them.

One form of device embodying my invention and in the construction and use of which the objects herein set out, as well as others, may be attained, is illustrated in the accompanying drawings, in which—

Figure 1 is a view in side elevation of an automobile showing my improved hand grasps in place on the doors thereof.

Figure 2 is a perspective view of a portion of the side of an automobile, scale enlarged, showing my hand grasp in place.

Figure 3 is a view, scale still further enlarged, in cross section on a plane denoted by the dotted line 3—3 of Figure 4 through a portion of an automobile door showing my improved hand grasp in place.

Figure 4 is a face view of my improved hand grasp shown as applied to an automobile door.

Figure 5 is a detail view in section on a plane denoted by the dotted line 5—5 of Figure 4 and showing a fragment of my improved hand grasp, the scale being enlarged to clearly illustrate its construction.

Figure 6 is a detail view illustrating the buttons employed in the structure of the hand grasp.

In the accompanying drawings the numeral 7 indicates the door of an automobile shown as equipped with my hand grasp that is applied to the upper edge thereof. It is practically a universal custom in opening and closing automobile doors to grasp the upper edge of the door with the hand, and without some protection the surface finish of the door at such point soon becomes marred and worn to an unsightly degree. It is, therefore, common practice to place some sort of a device over the edge of the door to protect it, and it is the purpose of my present invention to provide a device of this class that shall be serviceable, and extremely neat in appearance, and so made as to efficiently perform the functions required of it.

To this end my improved hand grasp comprises flaps 8 arranged to rest against the back and front surfaces of the door 7. These flaps 8 are joined by a connecting piece 9 that rests upon the upper edge of the door. In constructing my improved hand grasp I provide an outer piece 10 and an inner piece 11 of suitable material, as leather, one of which will form the inner surface of the hand grasp and the other of which will comprise the outer surface thereof. If desired the inner piece 11 may be made of some soft material that, while withstanding the wear, will be especially adapted for contact with a finished surface to prevent marring it.

Forms 12, in the shape of plates of metal or other material, are placed between the outer and inner pieces 10 and 11 of the flaps, these forms being for the purpose of preserving the shape of the flaps, and thereby retain said flaps in their extended positions. In the preferred form of construction and as herein shown these forms are of U-shape in cross section and they are formed with end and side bars bounding a central opening to provide a frame like structure with a border extending adjacent to both side edges and the outer end edge of the flaps, and as shown in dotted lines in Figure 4 of the drawings. It will be readily understood from an inspection of Fig. 4 that the frame-like structure of the form 12 provides an inner gripping portion or area that is free of the metallic form so that a substantially cushion-like grip will be afforded. The frame structure embodying the side bars securely anchors the grasp upon the car door with a resultant comparatively soft and flexible grip inwardly of the side bar positions. As the major portion of the gripping area is free of the form, injury to the surface finish on the door will be materially reduced. The material comprising the flaps may be stitched, if desired, to provide pockets within which the forms may be inserted, or the stitching may be such as to permanently retain the forms in place. Preferably the inside piece 11 extends from one bottom edge upwardly around that part comprising the top and down to the opposite bottom edge, the forms being secured as above described by stitching around the edge, and in order to secure a form in place and prevent it from sliding or shifting, holes 13 are made, preferably through the cross piece at the bottom of the form, to receive prongs 14 of buttons 15. These buttons may be of any ordinary construction that will provide for the display of characters 16 thereon, which characters may be letters comprising the initials of the owner of the automobile, and the construction, therefore, provides means for not only protecting the door and the finished surface thereof, but also a means for displaying the initials of the owner of the vehicle, the grasp serving a double purpose, to wit: that of protection and a means for displaying the initials of the owner, the latter serving the double purpose of that of displaying said initials and also as a means for securing parts of the grasp in place.

As hereinbefore described the frame 12 is of U-shape in cross section, the side parts thereof being preferably separated to an extent slightly less than the dimensions of the thickness of the door so that they may be sprung apart to enable the hand grasp to be placed upon the door, after which the spring qualities of the frame will hold the grasps securely upon the door.

It is not absolutely essential to my invention that the frame shall be made of a single piece of metal, as it will be obvious that certain advantages in maintaining the shape of the hand grasps and thereby preserving the form of the entire structure will be obtained with said frame composed of more than a single piece of metal.

I claim—

1. A hand grasp comprising a piece of material formed to provide flaps, a form of shaping material made in the form of a U-shaped frame with an end and with side bars bounding a central opening and constituting a border corresponding in shape to that of said flaps with the intermediate portion of the flaps free of the form and means for securing the frame to said flaps.

2. A hand grasp U-shape in edge elevation and comprising flaps joined together and each formed of two pieces of material, and a form of shaping material U-shaped in edge elevation comprising a single piece formed into spaced side parts and secured between the two pieces comprising each of said flaps with the intermediate portion of the flaps free of the form.

CARL H. GUSTAFSON.